Patented Nov. 4, 1941

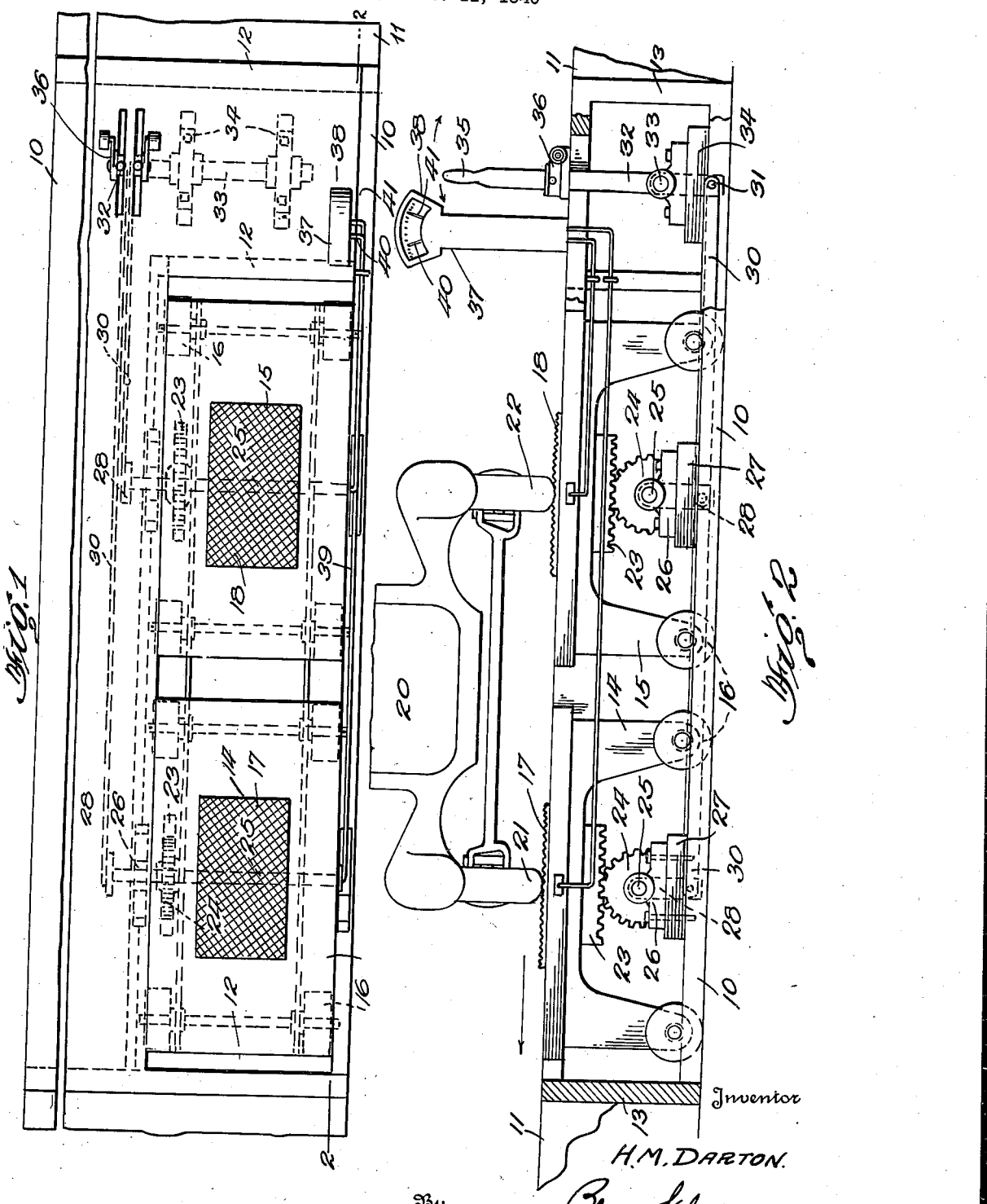

2,261,342

UNITED STATES PATENT OFFICE 2,261,342

AUTOMOBILE TESTING MACHINE

Herbert M. Darton, New Haven, Conn.

Application October 11, 1940, Serial No. 360,836

3 Claims. (Cl. 33—203)

This invention relates to automobile testing machines and more particularly to machines adapted to test the alignment of the wheels of an automobile as well as any looseness, especially with respect to the machine frame and the king-bolt connections.

As is well known, many states require periodic inspection of automobiles to determine their safety and fitness, and the present machine is designed more particularly to ascertain whether or not the wheels are in proper alignment and also whether the bearings, king-pins, and associated parts are at the desired degree of tightness. For example, if the king-pin is loose in its bearings, then there is a tendency for the wheels of the automobile to "shimmy" at certain speeds, thereby causing accidents.

One of the objects of the present invention is to provide a relatively simple and practical machine of the above general character which may be inexpensively manufactured, assembled and installed.

Another object of the invention is to provide an easily operable machine of the above character whereby the automobile may be quickly tested to determine the alignment of either wheel independently of the other, and also to ascertain the degree of looseness in the bearings, king-pins, etc.

A further object is to provide a reliable mechanism of the above general character, in which the above-referred to tests may be carried out accurately and in a minimum amount of time.

Other objects will be in part obvious from the annexed drawing and in part hereinafter indicated in connection therewith by the following analysis of the invention.

This invention accordingly consists in the features of construction, combination of parts and in the unique relation of the members and in the relative proportioning and disposition thereof, all as more completely outlined herein.

To enable others skilled in the art to fully comprehend the underlying features of this invention, that they may embody the same by the numerous modifications in structure and relation contemplated by the invention, a drawing depicting several forms of the invention has been annexed as part of this disclosure, and in such drawing like characters of reference denote corresponding parts throughout all of the views, in which—

Fig. 1 is a plan view of the complete apparatus, certain concealed parts being indicated in dotted lines;

Fig. 2 is a vertical sectional view of the parts shown in Fig. 1 and taken substantially along the line 2—2 of Fig. 1.

Referring now to the drawing in detail, 10 indicates the longitudinals of a rectangular frame sunk in a pit, the upper surface of which is substantially on a level with the floor 11 of a garage or testing plant. The frame is also provided with transverse members 12 and uprights or end walls 13 and such other parts necessary to form a substantial and strong weight supporting rectangular frame. Obviously instead of a pit the frame may be above ground level with a short ramp leading up thereto. Such a construction permits easier access to the gearing within the frame. The pit or depression if used, and in which the operating mechanism is located, is preferably approximately one foot in depth slightly longer than an automobile, and of a width substantially twice the normal width of an automobile, as indicated in Fig. 2.

For convenience, there is provided near one end of the pit, operating and indicating mechanisms hereinafter described, while the central part of the pit is provided with two similarly shaped and independently movable supports such as cars 14 and 15 having roller means such as wheels or casters 16, adapted to travel along the floor of the pit and between the longitudinals 10 which also act as suitable guides or tracks. The upper surfaces of the cars 14 and 15 provide separate scuff plates 17 and 18 on to which the front or rear wheels of an automobile indicated at 20 are adapted to be driven in a direction substantially transverse to the length of the apparatus, Fig. 1, with the wheels 21 and 22 thereof being positioned substantially centrally of the scuff plates 17 and 18, respectively, as clearly shown in Fig. 2.

The under side or frame of each car 14 and 15 is provided with a rack 23 adapted to be engaged by a pinion 24 mounted upon a shaft 25 rotatable in suitable bearings 26, all of which parts are mounted upon fixed blocks 27 secured to the longitudinals 10. Each shaft 26 has fixed or keyed thereto a downwardly extending arm 28 as shown at the left in Fig. 2, and top of Fig. 1, the lower ends of which are connected by means of rods 30 with respective means such as the lower ends 31 of lever 32 which are pivoted on a shaft 33 mounted in suitable bearings supported by blocks 34. This support in the present case is preferably secured to the bottom of the frame as shown in Fig. 1, as convenient or desired. It is preferable to employ two of these blocks 34 in order to maintain the shaft 33 in rigid alignment. The operating levers 32 extend upwardly through suitable flooring covering the upper surface of the frame and are provided with operating handles 35 whereby these levers may be swung to the right or left as desired when testing looseness.

A lock mechanism 36 of any desired type is associated with each of the handles 35, thereby to hold either handle rigid against any lateral movement as and when desired, and to permit the independent rocking movement of the other, all as will be more fully hereinafter explained in connection with the operation of the machine.

On the floor preferably adjacent the operating handles are positioned two dials or scales 37 and 38 of any desired style with which cooperate pointers 40 and 41. These pointers are connected by rods 39, respectively, with the scuff plates 18 and 17, as clearly shown in Fig. 2. It will thus be seen that as the scuff plates 17 and 18 are moved or oscillated to the right or left, either by means of handle 35 or by the action of the approaching car, as driven on to the plates, these pointers will likewise move a corresponding distance to register or indicate the amount of movement on the scales 37 and 38.

In testing an automobile for alignment of wheels, the two scuff plates 17 and 18 are moved by the handles to central or neutral position, that is, with the pointers 40 and 41 indicating zero upon the scales 37 and 38. The car is then driven transversely of the pit onto the plates, and any misalignment of the wheels is indicated by these scales for the reason that, as is well known to those familiar with the subject, automobile wheels, when in proper alignment, have a very slight convergence towards each other, viewed from the driver's seat. Consequently, as the wheels engage the scuff plate, this slight inward inclination will cause a slight separation of the two scuff plates and move the corresponding supports on their roller bearings 16. This movement should perhaps equal one point each on the scales 37—38. If, however, both wheels are absolutely parallel, no change in indication would appear upon the scales while if they diverge equally outwardly then an equal indication would appear upon the opposite side of both zero points. If the indication on both scales is equal, then it can be assumed that both wheels are out of alignment equally. If, on the other hand, the divergence or convergence of one is greater than the other, such would appear upon the respective scale as the automobile came to rest on the neutrally positioned scuff plates, and the mechanic would know immediately which wheel was out of alignment as well as the extent thereof and could at once indicate the same on his record chart for correction before the car passed inspection.

The other feature to be tested, namely, looseness of king-pins, is determined by locking one or the other of the levers 32 in fixed position by means of the lock mechanism 36 when the automobile is at rest on the scuff plates after the first test and rocking the other lever. This locking prevents any movement whatever of one scuff plate while the other scuff plate and its associated support is permitted to be rocked back and forth by the other lever 22 supporting the other wheel of the automobile.

The extent of such rocking movement with respect to a zero position is indicated on the scale 37 or 38, depending upon which lever and supporting car is locked against movement, and if this movement exceeds a predetermined indication then the associated king-pin and bearings are marked for adjustment or tightening. As soon as one wheel bearing is tested then the support upon which that wheel rests is locked in position against any movement, and the lock associated with the other operating handle 32 released, whereupon the same procedure is followed to determine the looseness of either king-bolt and bearing associated with other wheel. All of these tests may be carried out one after the other in not over two or three minutes, thus providing a rapid inspection of a series of automobiles in a minimum amount of time.

As soon as the test has been completed, the automobile is moved off of the testing bed, preferably in a continuation of the direction of its approach thereto, and the next car is tested in a similar manner to reliably determine these two important possible defects.

The mechanism herein described is of simple and practical construction and may be installed in any garage or testing plant at minimum expense.

While the present construction is below ground level for the most part, obviously it could be on a raised platform if desired. Also the relative position of the operating levers 32 either at the side or in front of the frame is immaterial. Some manufacturers may prefer them at the end so as to observe the operation of the wheels, but such position might interfere with the approach or departure of the car. As stated, the dials or indicators are of any desired construction, and are indicated largely diagrammatically. They could obviously extend vertically, or be mounted on the testing plant wall if convenient, and as to these minor details, no claim is made.

Without further analysis, the foregoing will so fully reveal the gist of this invention that others can, by applying current knowledge, readily adapt it for various applications without omitting certain features that from the standpoint of the prior art, fairly constitute essential characteristics of the generic or specific aspects of the invention, and therefore such adaptations should and are intended to be comprehended within the meaning and range of equivalency of the following claims.

I claim:

1. In an automobile testing machine of the character described, in combination, a pair of plates on which a pair of wheels of an automobile is adapted to rest, independent supports for each of said plates, tracks positioned beneath said supports, roller means adapted to travel on said tracks whereby the supports may move transversely of the automobile resting on said plates, means for moving said plates including rack and pinion mechanisms with operating levers connected therewith, means for locking at will either of said levers and the supports with which they are connected, and means for indicating the extent of movement of said plates.

2. In an automobile testing machine of the character described, in combination, a pair of scuff plates on to which an automobile is adapted to be driven with a pair of wheels resting thereon, independent supports for each of said scuff plates, tracks positioned beneath said supports, roller bearings adapted to travel on said tracks whereby the supports may move transversely of said automobile wheels supported on said scuff plates, two adjacent levers for moving said supports including linkage connected therewith and the scuff plates, means for locking at will either of said levers against movement, and means for indicating the extent of movement including pointers connected with said support thereby to indicate the extent of movement of said plates, said indicating means being adjacent and viewable by the operator of said levers and positioned at one side of the plates.

3. In the automobile testing machines of the character described, in combination, a pair of scuff plates on which a pair of wheels of an automobile is adapted to rest, independent cars supporting each of said scuff plates, tracks positioned beneath said cars, roller bearings adapted to travel on said tracks whereby the cars may move transversely of the automobile supported on said scuff plates, means for moving said cars including rack and pinion mechanisms and operating levers connected therewith, means for locking either of said levers as desired and the cars with which they are connected, and means for indicating the extent of movement of said cars including two sets of relatively movable pointers, one set of which is connected with each car thereby to indicate the extent of the movement of that car when moved with respect to the other.

HERBERT M. DARTON.